United States Patent
Tului et al.

(10) Patent No.: US 6,761,937 B2
(45) Date of Patent: Jul. 13, 2004

(54) PROCESS FOR THE MANUFACTURING OF CERAMIC-MATRIX COMPOSITE LAYERS

(75) Inventors: Mario Tului, Rome (IT); Teodoro Valente, Rome (IT)

(73) Assignee: Centro Sviluppo Materiali S.p.A., Rome (IT)

( * ) Notice: Subject to any disclaimer, the term of this patent is extended or adjusted under 35 U.S.C. 154(b) by 0 days.

(21) Appl. No.: 10/095,108

(22) Filed: Mar. 12, 2002

(65) Prior Publication Data

US 2002/0151427 A1 Oct. 17, 2002

(30) Foreign Application Priority Data

Mar. 12, 2001 (IT) .................................. RM2001A0125

(51) Int. Cl.$^7$ ............................................... C23C 4/10
(52) U.S. Cl. ...................... 427/450; 427/453; 427/446
(58) Field of Search ................................ 427/453, 450, 427/446

(56) References Cited

U.S. PATENT DOCUMENTS

| | | | | |
|---|---|---|---|---|
| 3,617,358 A | * | 11/1971 | Dittrich ...................... | 427/447 |
| 3,974,245 A | * | 8/1976 | Cheney et al. ................ | 75/336 |
| 4,447,503 A | * | 5/1984 | Dardi et al. ................ | 428/632 |
| 4,645,716 A | * | 2/1987 | Harrington et al. ......... | 428/472 |
| 5,714,243 A | * | 2/1998 | Mammino et al. ....... | 428/306.6 |
| 6,106,903 A | * | 8/2000 | Upadhya .................... | 427/450 |

FOREIGN PATENT DOCUMENTS

| | | | |
|---|---|---|---|
| FR | 2 453 713 | * | 12/1980 |
| JP | 58-146003 | * | 7/1983 |
| JP | 09-217163 | * | 8/1997 |

OTHER PUBLICATIONS

Metals Handbook, Ninth Edition, vol. 5: Surface Cleaning, Finishing, and Coating, American Society for Metals, 1982, p. 363.*

* cited by examiner

Primary Examiner—Katherine A. Bareford
(74) Attorney, Agent, or Firm—Browdy and Neimark, P.L.L.C.

(57) ABSTRACT

Process for the manufacturing of ceramic-matrix composite layers resistant to very high temperatures, comprising the steps of: preparing the powders for the feeding of the deposition plant by wet mixing of the ceramics constituting the material in form of fine powders and atomizing the suspension in the presence of a hot air jet; and depositing by plasma thermal spraying with an inert gas flow and with a >30 kPa pressure in a deposition chamber. This process forms composite layers having a very high resistance, apt to be employed as coatings for vehicles, of the type destined to reenter Earth atmosphere from outer space and to be launched again therein.

16 Claims, 1 Drawing Sheet

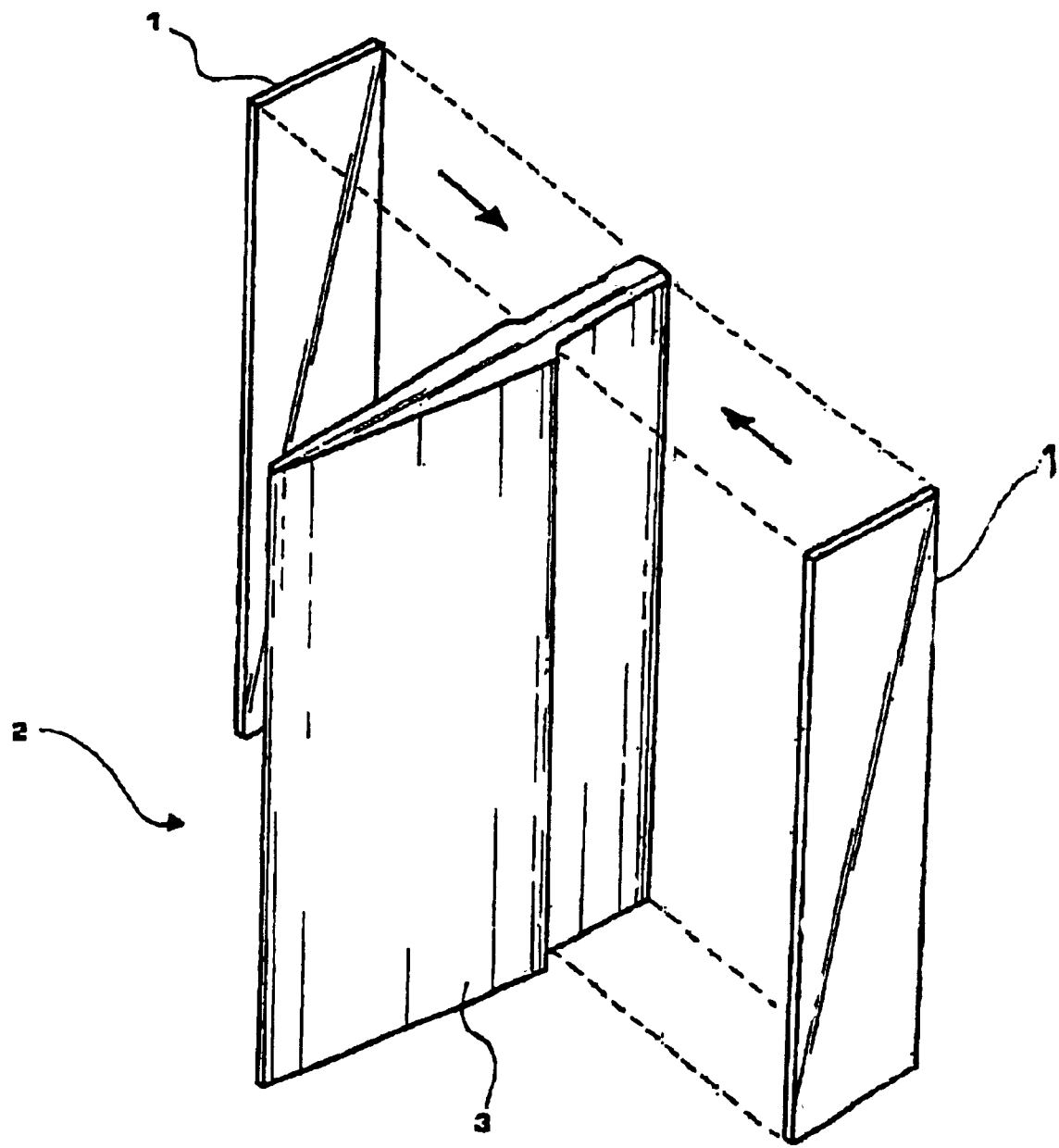

PROCESS FOR THE MANUFACTURING OF CERAMIC-MATRIX COMPOSITE LAYERS

FIELD OF THE INVENTION

The present invention refers to a process for the manufacturing of ceramic-matrix composite layers resistant to very high temperatures, like e.g. Boride mixtures, like e.g. Zirconium, Titanium and/or Hafnium Borides, or Oxide mixtures, like e.g. Hafnium and/or Zirconium Oxides, and Carbides, like e.g. Silicon, Tantalum, Zirconium and/or Hafnium Carbides. These layers can serve as protective coating of the material onto which they are coated, or they can be employed as components per se, upon having removed the substrate material, e.g. by machining or by chemical attack. Hence, the present invention further refers to the composite material obtained by said process.

BACKGROUND OF THE INVENTION

Of late years, a specific class of materials, that of the Ultra High Temperature Ceramics (UHTC) has aroused a marked interest for prospective employs thereof in the aerospace field.

In particular, a group of composites having as matrix the Borides of some transition metals ($ZrB_2$ and $HfB_2$) is deemed to be the most suitable to the thermal protection of sharp leading edges for the new generations of space vehicles, apt to reenter Earth atmosphere after a stay thereof in outer space and to be launched again therein.

The context of said viable and exemplary employ of the materials object of the present invention will be detailed hereinafter.

The material specifications required by such a specific employ are extremely complex and difficult to attain all in the same material. In fact, the materials at issue should combine high thermal conductivity coefficients and high resistance to thermal shocks to a very high melting point and a low thermal expansion coefficient.

The high melting point, apt to reach the 3300 K, is a real obstacle to the shaping of these materials. In fact, the sole technique capable of ensuring satisfactory features in terms of porosity and of mechanical resistance is the hot pressing, entailing, however, remarkable limitations in terms of sizes and costs.

Other shaping techniques are known. E.g., the plasma thermal spraying overcomes the problems entailed in the hot pressing forming techniques of the state of the art. In fact, the employ of a plasma that in its hotter region could reach and exceed the 20000 K enables the deposition of virtually all those elements or compounds having a stable liquid phase. However, it should be borne in mind that the manufacturing of self-standing, high-melting ceramics-based coatings and supports still constitutes, due to the required powers, a frontier research field in the employ of the plasma thermal spraying. Moreover, depositing a composite material entails the risk of interactions between the constituent phases thereof.

SUMMARY OF THE INVENTION

The present invention consists of a methodology of depositing by plasma thermal spraying, yielding Boron (Boride)-based, Oxygen (Oxide)-based, Boride and Oxide mixtures-based, and Carbon (Carbide)-based ceramic-matrix composite materials. These composites are characterized by the concomitant presence of highly compact ceramics phases (density >96% of the theoretical density).

The present invention aims at attaining these features, overcoming the obstacles present in the state of the art.

Hence, the present invention refers to a process as abovespecified, comprising the steps of:
- preparing the powders for the feeding of the deposition plant by wet mixing the ceramics constituting the material in form of fine powders and atomizing the suspension in the presence of a hot air jet;
- depositing by plasma thermal spraying with an inert gas flow and with a >30 kPa pressure in a deposition chamber.

The main advantage of the process according to the invention lies in forming complex-shaped and self-standing composite layers suitable to the most extreme employs, as in the coatings of space vehicles.

The present invention will hereinafter be described according to preferred embodiments thereof, given as a non-limiting example with reference to examples reported hereinafter and to the individual FIGURE attached.

BRIEF DESCRIPTION OF THE DRAWINGS

The individual FIGURE attached depicts a component coated according to the abovedefined process.

DESCRIPTION OF PREFERRED EMBODIMENTS

The process subject-matter of the invention is based on plasma spraying, in which a plasma generated by an electric arc is employed to melt and to accelerate powders of the materials to be deposited. Hence, the process comprises the methodology for preparing the starting powders and the selection of the spraying process parameters.

The powders are prepared mixing thereamong the different ceramics materials, in form of powders having a <10 $\mu$m average particle size so as to attain powders made of particles having a >10 $\mu$m average diameter and a satisfactory flowability.

The different ceramics materials are destined to form the different phases of a ceramic-matrix composite layer.

The powders are made of two distinct ceramics materials, the first one being Boron (Boride)-based, Oxygen (Oxides)-based, and based on mixtures thereof, and the second one being Carbon (Carbide)-based.

The first material may be selected from a group of compounds comprising Zirconium Boride, Titanium Boride, Hafnium Boride, Zirconium Oxide, Hafnium Oxide, and mixtures thereof.

The second material may be selected from a group of compounds comprising Silicon Carbide, Titanium Carbide, Tantalum Carbide, Zirconium Carbide, Hafnium Carbide, and mixtures thereof.

The ratio among these materials may vary according to the needs and to the properties to be conferred to the ceramic matrix. In the present embodiment, the first material is present in a 40% to 95% ratio (preferred: about 75%), and the second material is present in a 5% to 60% ratio (preferred: about 25%). It is understood that said ratios should be compatible with the structure provided for the ceramic matrix.

Said mixing may be wet, i.e., carried out, e.g., in an aqueous environment or in the presence of water-dissolved organic binders, e.g. of a polyvinyl binder.

The suspension resulting from said mixing may be dried and atomized, i.e. finely dispersed, nebulizing it with a >200 kPa compressed hot-air jet, in particular to a >373 K temperature, thereby obtaining a powder apt to be employed in a plasma spraying plant.

Said powders, prior to the plasma spraying, may be subjected to an optional thermal treatment fostering the sintering thereof.

The deposition of the layers of composite material, starting from the powders thus prepared, should take place under the following conditions:

(a) in the presence of an inert, i.e. non-oxidizing, e.g., Argon (Ar), atmosphere in order to prevent particle reactions during the deposition; and (b) with a high-temperature and high-density plasma, in order to allow the complete melting of the particles.

The specific parameters vary according to the selected materials.

The deposition will take place under a non-oxidizing gas atmosphere, at a power such as to attain a plasma temperature sufficiently high to form a composite matrix. Parameters like the distance between the torch and the substrate to be coated, the powder feed flow rate, the number of required passes and the temperature to be conferred to the substrate will suitably be selected.

The pressure in the deposition chamber is >30 kPa, and it preferably ranges from 120 to 300 kPa.

The plasma is generated by an electric arc having a >30 kW power, and preferably ranging from 35 to 55 kW.

The employed plasma is formed ionizing a flow of Argon and Hydrogen mixtures, having a Argon flow rate of >20 SLPM (Standard Liters Per Minute), and preferably ranging from 35 to 55 SLPM, and having a Hydrogen flow rate of >6 SLPM, and preferably ranging from 8 to 15 SLPM.

Alternatively, the employed plasma is formed ionizing a flow of Argon and Helium mixtures, having an Argon flow rate of >10 SLPM, and preferably ranging from 15 to 30 SLPM, and having a Helium flow rate of >30 SLPM, and preferably ranging from 50 to 100 SLPM.

The coated substrate, post-deposition and after a suitable cooling thereof, may be subjected to optional machine finishing.

EXAMPLE 1

The deposition of a coating of UHTC material, consisting of a $ZrB_2$ matrix incorporating evenly distributed SiC particles, was carried out.

The process for the attainment thereof was based on the following steps:

(i) $ZrB_2$ powders, having a 5 μm average particle size, and SiC, having a 0.7 μm average particle size, were mixed in an aqueous suspension, in the presence of a polyvinyl binder, in the ratios: 75% (b/w) $ZrB_2$ and 25% SiC. Then, the suspension was atomized with a 520 K compressed air flow;

(ii) the powders were sprayed with a ≦80 kW power plasma torch. Said torch was installed in a vacuum chamber, so as to control the atmosphere composition and pressure;

(iii) as substrate, a 40 mm-diameter graphite tubular component was employed;

(iv) prior of starting the deposition, the chamber was scavenged up to a 2 Pa vacuum level. Subsequently, Ar was inletted, up to a 200 KPa pressure;

(v) then the deposition process was started, employing the following parameters:

plasma generating gas flow: 47 SLPM Ar+10 SLPM $H_2$ (SLPM=standard liters per minute).

electric arc power: 42 kW.

Torch-substrate distance: 110 mm.

powder feed flow rate: 7 g/min.

number of torch passes onto substrate: 75.

during the deposition the substrate did not surpass the temperature of 500 K; this situation was attained cooling the substrate with an Ar flow at ambient temperature.

At the end of the deposition process the coated sample was extracted from the deposition chamber and subsequently tested with a thermal cycling test under inert atmosphere of between 600 K and 2300 K. Several cycles were carried out, in each thereof the component having been heated up to 2300 K over a time equal to 200 s, held thereat for a time equal to 600 s, and finally cooled down to 600 K over a time equal to 600 s.

At the end of the test, there were carried out non-disruptive tests, and subsequently optical microscopy analyses, which did not highlight mechanical damage (like cricks and/or detachments from the substrate).

EXAMPLE 2

The deposition of a coating of UHTC material, consisting of a $HfB_2$ matrix incorporating evenly distributed SiC particles, was carried out.

The process for the attainment thereof was based on the following steps:

(vi) $HfB_2$ powders, having a 5 μm average particle size, and SiC, having a 0.7 μm average particle size, were mixed in an aqueous suspension, in the presence of a polyvinyl binder, in the ratios: 75% (b/w) $ZrB_2$ and 25% SiC. Then the suspension was atomized with a 520 K compressed air flow;

(vii) The powders were sprayed with an ≦80 kW power plasma torch. Said torch was installed in a vacuum chamber, so as to control the atmospheric composition and pressure;

(viii) as substrate, a stainless steel AISI 416 sheet was employed;

(ix) prior of starting the deposition, the chamber was scavenged up to a 1 Pa vacuum level. Subsequently, Ar was inletted, up to a 220 kPa pressure;

(x) then the deposition process was started, employing the following parameters:

plasma generating gas flow: 40 SLPM Ar+12 SLPM H2 (SLPM=Standard Liters Per Minute).

electric arc power: 45 kW.

torch-substrate distance: 110 mm.

powder feed flow rate: 10 g/min.

number of torch passes onto substrate: 80.

during the deposition the substrate did not surpass the temperature of 400 K; this situation was attained cooling the substrate with an Ar flow at ambient temperature.

At the end of the deposition process, the coated component was extracted from the deposition chamber. Then the substrate was removed by machining (milling), thereby obtaining a 1.2 mm thick $HfB_2$-SiC composite plate.

At one end of said plate, a bevel was obtained by diamond tool machining, so as to simulate a sharp leading edge.

In the FIGURE, a component 1 made with a coating 2 obtained with the abovedescribed process, with a characteristic sharp angle shape whose function will be detailed hereinafter, is sketched.

The component, apt to form the leading edge of a wing of an aerospace vehicle apt to repeatedly reenter Earth atmosphere, comprises suitable fastening means 3 to connect it to the wing structure.

Concerning the application of like coatings, the employ thereof in the aerospace industry is of the utmost interest.

In fact, the Earth atmosphere reentering stage, at the end of an orbital or interplanetary flight, is particularly severe for the vehicles, subjected to an intense thermal flow due to the resistance of the atmospheric strata. To date, for manned missions two reentry modes are provided: ballistic, usually not implying the reuse of the vehicle, or airlift-supported.

A airlift-supported reentry implies that the vehicle have an adequate configuration, developing a non-nil lift/drag ratio (L/D>O); the adopted trajectory is long, and it enables, as long as maneuverability during the final stage of the flight is ensured, a conventional-type landing, with no vehicle damage compromising the reuse thereof.

By virtue of the longer stay in the atmosphere, the variation of kinetic energy is distributed over a lengthier time interval, thereby reducing the heat flow to which the structure is subjected. In this case, the thermal protections consist of thermally insulating shields operating under non-ablative conditions, which shield the inside of the vehicle and irradiate towards the outside thereof a substantial fraction of the absorbed heat. The application of ablative shields would prove inappropriate, as the materials available to date would not reach a temperature high enough to be up to their task, merely undergoing degradation.

The selection of the airlift-supported reentry has paved the way to the first generation of Reusable Launch Vehicles (RLV's), the Space Shuttles, since post-landing each Shuttle is nearly unscathed and it can subsequently be reused in further workcycles. However, aircraft operativeness is not free from problems, some of which being of pressing interest to the future development of Space activities, concerning the correlation between the thermal protection systems and the aerodynamic efficiency of the aircrafts. A particularly relevant problem, affecting the operativeness of the first generation of RLV's lies in the modest aerodynamic efficiency, expressed by the Lift/Drag ratio, of the edges adopted. Due to the blunt configuration of the nose and of the leading edges of the wings, the vehicles meet a remarkable drag which has to be compensated, during the launch, by a power surplus, and which entails a payload reduction.

Moreover, the selection of the reentry trajectory is complicated. However, to date this configuration is unavoidable in order to dispose of the heat generated by atmospheric friction. Hence, so far a different configuration, with sharp leading edges and pointed nose, has not proved viable, relevant advantages thereof notwithstanding.

Among said advantages, e.g., an increased aerodynamic efficiency and therefore an increased payload, greater freedom in selecting the reentry orbits, lesser interferences due to the free electrons associated to the rounded edges.

In particular, the increased aerodynamic efficiency is due to the decreased contribution to the drag caused by the reduction of the related momentum associated to the fluid crossed.

The reason behind the discarding of the sharp configuration in hypersonic applications essentially lies in the irreconciliability between the aerothermal constraint imposed thereby and the performances of the available thermal protections. The latter generally attain ablative conditions, with the entailed rounding off of their edges and the decay of the efficiency features thereof. Therefore, in the X-15 rocket vehicles and in the Apollo and Shuttle missions the blunt configuration has mandatorily been adopted, it being less effective yet capable of protecting the structures from excessive thermal loads. By virtue of the detached shock system associated thereto, the heat flow generated by the change in momentum inside of the fluid does not directly burden the sharp leading edge surrounding it, thereby preventing the overheating thereof.

The above remarks highlight how some of the problems related to the reentry operativeness of the RLV's be closely linked to the performances of the materials currently made available by the aerospace technologies. Apparently, as the length of the ground inspection times, as well as the aerodynamic efficiency, via the configuration of the edges, depend thereupon, and as these issues are crucial to the future development of the Space activities, the quest for materials exhibiting improved performances is fundamental.

The composite material manufactured with the above-described process, in particular from the $ZrB_2$-SiC and the $HfB_2$-SiC compounds, by virtue of the marked resistance thereof to high temperatures, can advantageously be employed in this context as composite coating layer.

The employ is made viable by the fact that they be suitable to the thermal protection of the sharp leading edges, thereby providing the implementation thereof in the future generations of RLV's.

To the abovedescribed process for the manufacturing and related material a person skilled in the art, in order to satisfy further and contingent needs, may effect several further modifications and variants, all however comprised in the protective scope of the present invention, as defined by the appended claims.

What is claimed is:

1. A process for the manufacturing of a high-temperature-resistant ceramic-matrix composite layers, comprising:
   preparing powders for the feeding of a deposition plant comprising a thermal spraying device and a deposition chamber, by wet mixing of ceramics constituting material in a powder form thereby obtaining a suspension; and atomizing the suspension in the presence of a hot air jet;
   depositing said suspension by plasma thermal spraying in a deposition chamber containing inert gas at a pressure greater than 200 kPa,
   wherein the powders are prepared mixing different ceramics materials, in the form of powders having a <10 $\mu$m average particle size, and
   wherein the powders are made of two distinct ceramics materials, the first material being selected from the group consisting of at least one boride, oxide and mixtures thereof, and the second material being at least one carbide.

2. The process according to claim 1, wherein the first material is selected from the group consisting of Zirconium Boride, Titanium Boride, Hafnium Boride, Zirconium Oxide, Hafnium Oxide, and mixtures thereof.

3. The process according to claim 1, wherein the second material is selected from the group consisting of Silicon carbide, Tantalium Carbide, Zirconium Carbide, Titanium Carbide, Hafnium Carbide, and mixtures thereof.

4. The process according to claim 1, wherein the first material is present in 40% to 95% by weight, and the second material is present in 5% to 60% by weight.

5. The process according to claim 1, wherein said mixing is carried out in an aqueous environment and/or in the presence of water-dissolved organic binders.

6. The process according to claim 1, wherein said hot air jet has a >373K temperature.

7. The process according to claim 1, wherein said inert gas contained in said deposition chamber comprises Argon, Helium or a mixture thereof.

8. The process according to claim 1, wherein said plasma is generated by an electric arc having >30 kw power.

9. The process according to claim 8, wherein the power of said electric arc ranges from 35 to 55 kw.

10. The process according to claim 1, wherein said plasma is formed ionizing a flow of Argon and Hydrogen mixtures, having a Arson flow rate of >20SLPM and having a Hydrogen flow rate >6 SLPM.

11. The process according to claim 10, wherein said Argon flow rate ranges from 35 to 55 SLPM and the Hydrogen flow rate ranges from 8 to 18 SLPM.

12. The process according to claim 1, wherein said plasma is formed ionizing a flow of Argon and Helium mixtures, having a Argon flow rate of >10 SLPM and having a Helium flow rate of >30 SLPM.

13. The process according to claim 12, wherein said Argon flow rate ranges from 15 to 30 SLPM and the Helium flow rate ranges from 50 to 100 SLPM.

14. The process according to claim 1 wherein, during the thermal spraying, the plasma has a temperature and density sufficiently high to enable the complete sintering of the sprayed particles.

15. The process according to claim 1 which is carried out at conditions whereby a highly compact ceramic phase having a density of greater than 96% of the theoretical density is obtained.

16. The process of claim 1, wherein the first material is present in an amount of about 75% by weight and the second material is present in an amount of about 25% by weight.

* * * * *